F. SCHNEIDER.
ADJUSTABLE BEARING.
APPLICATION FILED DEC. 16, 1913.

1,185,836.

Patented June 6, 1916.

Witnesses=
Oliver M. Kappler.
H. B. Fay.

Inventor
Franklin Schneider
by Fay & Oberlin
Attorneys

UNITED STATES PATENT OFFICE.

FRANKLIN SCHNEIDER, OF CLEVELAND, OHIO, ASSIGNOR, BY MESNE ASSIGNMENTS, TO THE VAN DORN ELECTRIC TOOL COMPANY, OF CLEVELAND, OHIO, A CORPORATION OF OHIO.

ADJUSTABLE BEARING.

1,185,836.  Specification of Letters Patent.  Patented June 6, 1916.

Application filed December 16, 1913. Serial No. 807,142.

*To all whom it may concern:*

Be it known that I, FRANKLIN SCHNEIDER, a citizen of the United States, and a resident of Cleveland, county of Cuyahoga, and State of Ohio, have invented a new and useful Improvement in Adjustable Bearings, of which the following is a specification, the principle of the invention being explained, and the best mode in which I have contemplated applying that principle, so as to distinguish it from other inventions.

The present invention relates to electrically operated tools, and in particular to means for journaling and for maintaining the bearings in adjustment for the shaft or spindle of the motor and the tools. It is desirable in such a machine in which the longitudinal thrust upon the shaft is considerable and in which it is extremely difficult to rigidly connect the motor shaft with the extension which serves as a tool spindle proper, to provide some means for flexibly or loosely connecting up these two shafts, and the present invention provides a method for so connecting them.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of the various mechanical forms in which the principle of the invention may be used.

Figure 1:
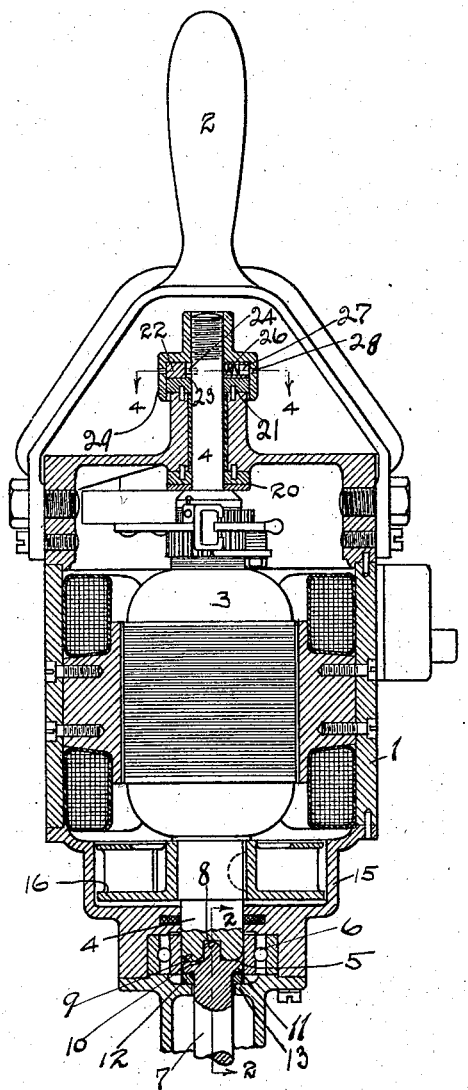
Figure 2:
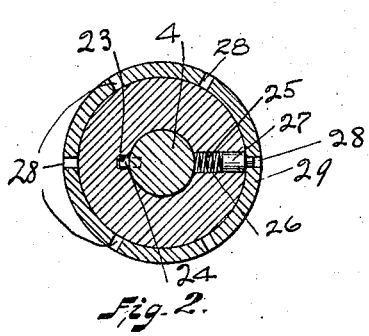

In said annexed drawing, Figure 1 is a central longitudinal section through an electrically operated tool to which my invention is applied; and Fig. 2 is a section on the line 4—4, Fig. 1.

The main features of the tool are plainly evident from Fig. 1, and need not be described in detail. A casing 1 is provided having a handle 2 and carrying a motor 3 which is shown with a shaft 4 extending at either end. The shaft 4 at its operating end is snugly fitted into the inner race 5 of the ball bearing 6, such ball bearing being suitably mounted in the casing 1. This end of the shaft 4 does not extend through the ball-bearing, thus permitting the introduction into the inner ball race of the inner end of a tool spindle 7. The formation of the outer end of the motor shaft is best seen in Fig. 1, there being a transverse slot 8 and the edges of the spindle being rounded off at 9 as shown. The inner end of the tool shaft 7 is provided with a rounded tongue 10 which is adapted to loosely enter the slot 8 in the motor shaft, such tongue being so formed on the end of the tool shaft that it will not reach the bottom of the slot in the motor shaft. There is also mounted upon this inner end of the motor shaft a rounded bead 11 which loosely enters the inner ball race but is not snugly fitted therein. By this construction I am enabled to secure the advantages and results of a universal joint but with an extremely simple construction and one less expensive and complicated than is a universal joint. The necessity for such a connection between the shaft and spindle is readily understood. When two shafts are to be connected in alinement, each must have at least one separate bearing and one bearing common to both. It is an expensive operation to bore three perfectly alined apertures in the casings and yet unless this is done at a single operation it is practically impossible to secure perfect alinement. The inaccuracy will probably be very slight but it will be sufficient to cause binding the shafts at the point of connection and at the common bearing.

The tool mechanism and the motor may thus be constructed and placed in the casing as entirely separate units, the removal of the tool spindle and tool not disturbing the motor which is still left in the casing as a separate unit, which may be handled entirely separate from the tool spindle. Attention is also called to the fact that the main casing 1 is provided at its lower or outer end with an end cover 15 which is removably attached to the main casing, such end cover receiving the ball-bearing 6 and housing the outer end of the motor shaft. Keyed to the motor shaft is a fan 16 adapted to some extent to cool the motor during operation.

The longitudinal thrust exerted by the shafts is considerable and causes relatively rapid wear on the usual thrust bearings if employed. I have, accordingly, designed convenient and accessible means for adjusting the thrust bearings employed for wear and have provided a device for locking the adjusting means against operation caused by vibration.

In order to take up the longitudinal thrust upon the motor shaft, I provide thrust bearings 20 and 21 at the inner end of the motor shaft 4. A plate 22 is fitted around the shaft 4 in contact with a thrust bearing 21, such plate being provided with a longitudinal slot 23, a pin 24 engaging the shaft 4 and the slot 23, thus permitting longitudinal movement of the plate 22 along the shaft, but preventing the same from rotating except with the shaft. A radial slot 25 is also formed in the plate 22, a spring 26 being mounted in this slot against the shaft 4 and a pin or plunger 27 being outwardly pressed by means of this spring. Such pin 27 is adapted to engage in any one of a number of slots or openings 28 formed in a cap or cover plate 29 which is adjustably mounted upon the inner end of the motor shaft 4.

In order to adjust the thrust bearings for wear, it is only necessary to depress the plunger 27 when the cap 29 may be adjusted longitudinally upon the shaft, thus pressing the plate 22 against the thrust bearing and tightening the same. As soon as the cap has been moved the desired amount the plunger 27 is allowed to be pressed outwardly again, in which case it will engage in one of the slots 28, thus locking the cap against further movement in either direction. This adjustment may be in either direction, either to tighten the bearing or loosen it and may be extremely sensitive since each notch represents but a few thousands of an inch of longitudinal adjustment of the bearings.

Other modes of applying the principle of my invention may be employed instead of the one explained, change being made as regards the mechanism herein explained, provided the means stated by any of the following claims or the equivalent of such stated means be employed.

I therefore particularly point out and distinctly claim as my invention:—

1. In a tool, the combination of a rotatable shaft, a bearing member therefor rotatably mounted but fixed against longitudinal movement, a thrust bearing for said shaft, a plate contacting said thrust bearing, said plate being normally held against longitudinal movement; and means adapted to move said plate longitudinally, thereby adjusting said bearing.

2. In a tool, the combination of a rotatable shaft, a bearing member therefor rotatably mounted but fixed against longitudinal movement, a thrust bearing for said shaft, a plate contacting said thrust bearing, said plate having a longitudinal slot, a pin attached to said shaft, said pin entering such slot, thereby preventing rotatable movement of said plate with respect to said shaft, and means adapted to move said plate longitudinally, thereby adjusting said bearing.

3. In a tool, the combination of a rotatable shaft, a bearing member therefor rotatably mounted but fixed against longitudinal movement, a thrust bearing for said shaft, a plate contacting said thrust bearing, said plate having a longitudinal slot, and a radial slot, a pin attached to said shaft, said pin entering such longitudinal slot, thereby preventing rotatable movement of said plate with respect to said shaft, a spring-pressed plunger disposed in such radial slot, a cap adjustably mounted on said shaft in contact with said plate, said cap being provided with a flange having a plurality of spaced apertures adapted, upon adjustment of said cap, to register with such radial slot in said plate and to receive said plunger.

Signed by me this 10th day of December, 1913.

FRANKLIN SCHNEIDER.

Attested by—
H. B. FAY,
A. L. GILL.